Figure 1:
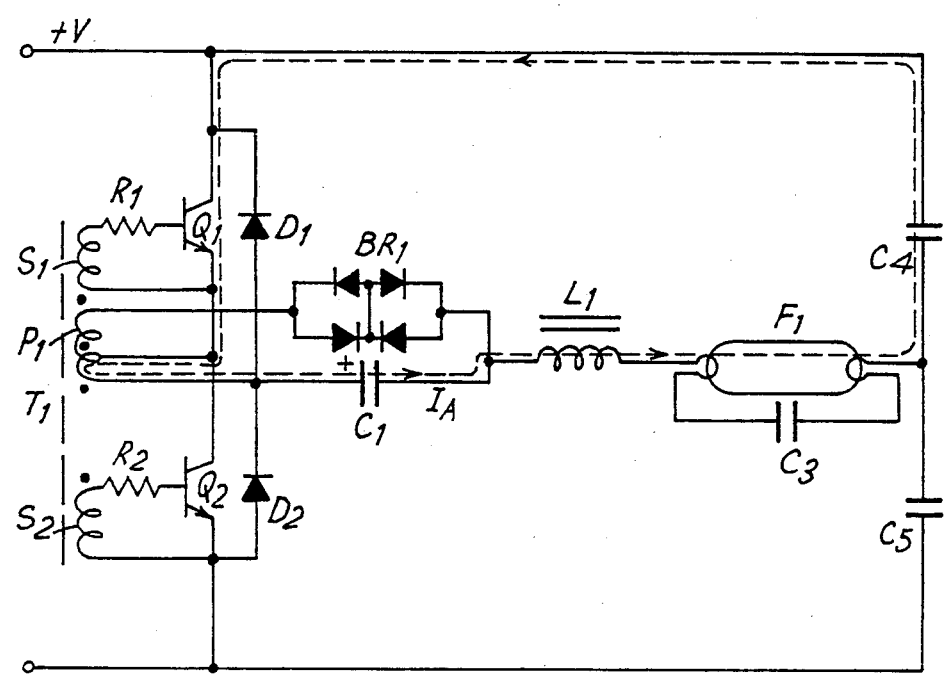

United States Patent [19]

Ball

[11] Patent Number: 4,722,040
[45] Date of Patent: Jan. 26, 1988

[54] SELF-RESONANT INVERTER CIRCUIT

[75] Inventor: David P. Ball, Auckland, New Zealand

[73] Assignee: Thorn EMI Lighting (NZ) Limited, Auckland, New Zealand

[21] Appl. No.: 882,178

[22] Filed: Jul. 7, 1986

[30] Foreign Application Priority Data

Jul. 8, 1985 [NZ] New Zealand .............. 212682

[51] Int. Cl.$^4$ .......................................... H02M 3/335
[52] U.S. Cl. ............................ 363/17; 315/DIG. 7
[58] Field of Search .................... 363/17, 98, 132; 315/DIG. 5, DIG. 7

[56] References Cited

U.S. PATENT DOCUMENTS

| 4,183,079 | 1/1980 | Wachi | 363/17 |
| 4,188,661 | 2/1980 | Bower et al. | 363/49 |
| 4,424,556 | 1/1984 | Maeda et al. | 363/17 |
| 4,439,819 | 3/1984 | Regan | 363/17 |
| 4,525,649 | 6/1985 | Knoll et al. | 315/96 |
| 4,532,456 | 7/1985 | Knoll et al. | 315/DIG. 7 X |
| 4,603,378 | 7/1986 | Virta | 363/132 X |

FOREIGN PATENT DOCUMENTS 2488477 2/1982 France .

Primary Examiner—Patrick R. Salce
Assistant Examiner—Marc S. Hoff
Attorney, Agent, or Firm—Fleit, Jacobson, Cohn & Price

[57] ABSTRACT

An inverter circuit is provided in which the current can be controlled and which, when used in a gas discharge lamp control circuit, enables dimming and cathode preheat. The inverter comprises two switching means arranged to operate alternately, each controlled by means of a respective secondary element of a transformer, a primary element of the transformer having separate connections to capacitive means and bidirectional threshold means such as a diode arrangement. The bidirectional threshold means and capacitive means are connected as parallel branches to an input of a resonant circuit adapted to receive a load such as a gas discharge lamp. The inverter may further include a variable reactance in the branch including the capacitive means and a sub-circuit may be used to regulate the reactance and thus to control the current drawn by the inverter.

11 Claims, 7 Drawing Figures

SELF-RESONANT INVERTER CIRCUIT

This invention relates to inverters and in particular to inverters for use with gas discharge lamps.

Some gas discharge lamps exhibit a negative resistance characteristic when the gas in the lamp is ionized. This means that as current begins to increase through the lamp, the resistance of the lamp decreases. This resistance decrease causes the current to further increase and unless some current-limiting ballast means is provided, the lamp will be destroyed. A ballast system is therefore required which will enable the lamp to operate at a sufficiently high current for satisfactory illumination.

Until a lamp ionizes, on the other hand, it exhibits a very high resistance. For this reason, the lamp requires a high starting voltage in order that the lamp may be ionized, to avoid cold striking. Cold striking causes cathode damage and is detrimental to lamp life.

Conventionally iron core chokes have been used for ballast purposes, and the iron core ballast and starter switch circuit has been used to operate fluorescent lamps. Iron core ballasts do however have undesirable characteristics, such as, inter alia, low power efficiency, audible vibration, considerable weight, the requirement for a substantial amount of iron, light flicker and delayed starting.

Recently, electronic ballasts have become available. These offer increased power efficiency, no audible noise, less weight, less light flicker, instant starting and dimming. They consist of essentially an inverter that converts DC into high frequency AC. The high frequency AC drives a series resonant circuit in which the inductive component ballasts the fluorescent lamps. High striking voltages are generated by resonant magnification. There are two variations of this circuit. Self resonant inverters are the simplest and perhaps the most reliable but they cold strike the lamps and dimming can only be achieved by a reduction in the applied voltage. Driven inverters are capable of dimming and cathode preheat but their circuitry is complex, requiring feedback, protection and control. They are costly and have potential reliability problems.

It is an object of the invention to provide a method and apparatus for controlling the current in a self-resonant inverter, thus enabling dimming and cathode preheat, without the above complexity.

According to the invention there is provided an inverter circuit comprising two input terminals for connecting a unidirectional current supply therebetween, two switching means connected in series across said input terminals, two secondary windings of a transformer, each arranged to control the operation of a respective switching means, a primary winding of the transformer having three connections of which the tap connection is to the junction of the two switching means, the other two being connected by parallel branches, one branch containing bidirectional threshold means, and the other containing capacitive means, to an input of a resonant circuit adapted to receive a load, and the output of the resonant circuit being connected via a first capacitor to one of said input terminals and via a second capacitor to the other of said input terminals, the arrangement being such that, in use, the switching means operate essentially alternately.

According to a further aspect of the invention there is provided an inverter circuit comprising two switching means arranged to operate alternately, each switching means controlled by means of a respective secondary winding of a transformer, a primary winding of the transformer having separate connections to capacitive means and bidirectional threshold means, the capacitive means and bidirectional threshold means being connected as parallel branches to an input of a resonant circuit adapted to receive a load.

The bidirectional threshold means may be rectifiers or diodes arranged in a bridge formation having a forward voltage drop. The switching means may for example be transistors, each being protected by a respective unidirectional means such as a diode. Alternative switching means include MOSFETs or thyristors.

"Transformer" is intended to include a conventional transformer or a similar device achieving the same effect.

An inverter circuit according to the invention may further include a variable reactance in the branch including the capacitive means. A sub-circuit may be incorporated to regulate this reactance and thus to control the current drawn by the inverter.

According to another aspect of the invention there is provided a gas discharge lamp control circuit including an inverter circuit as described in any of the five preceding paragraphs.

Figure 5:
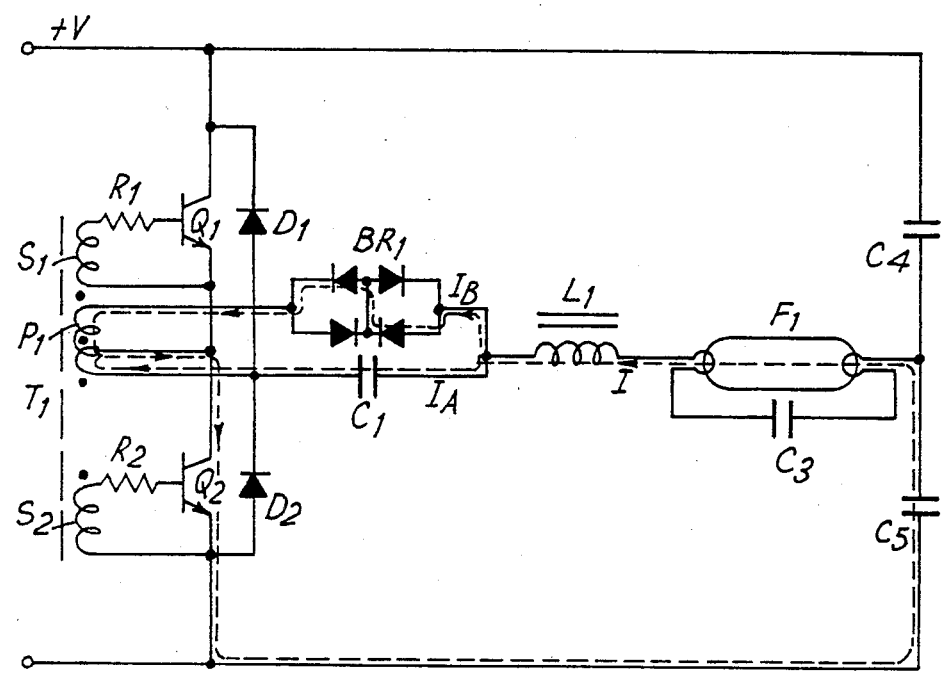
Figure 6:
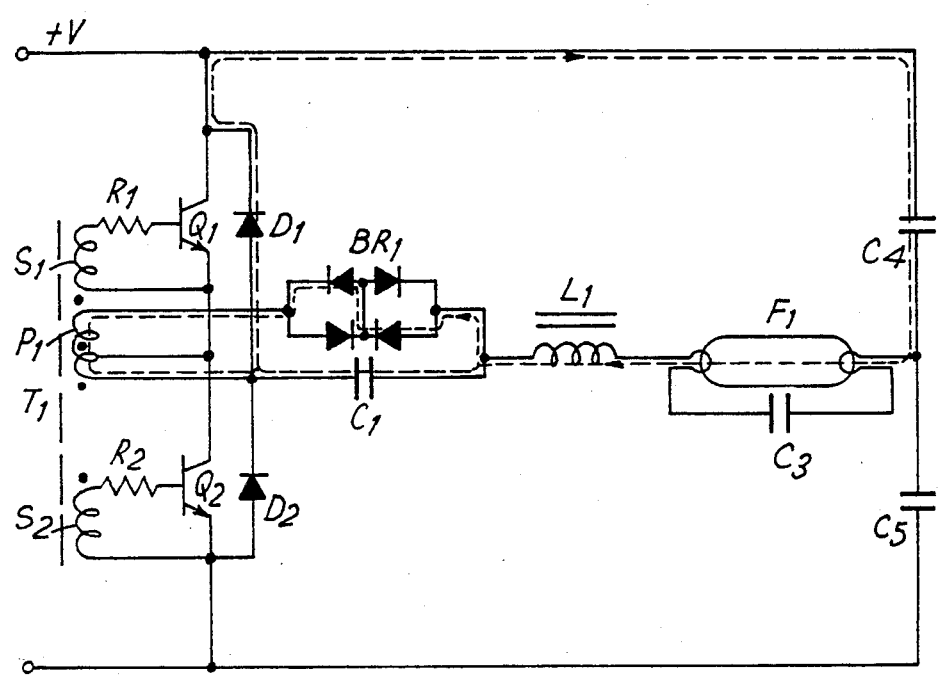
Figure 7:
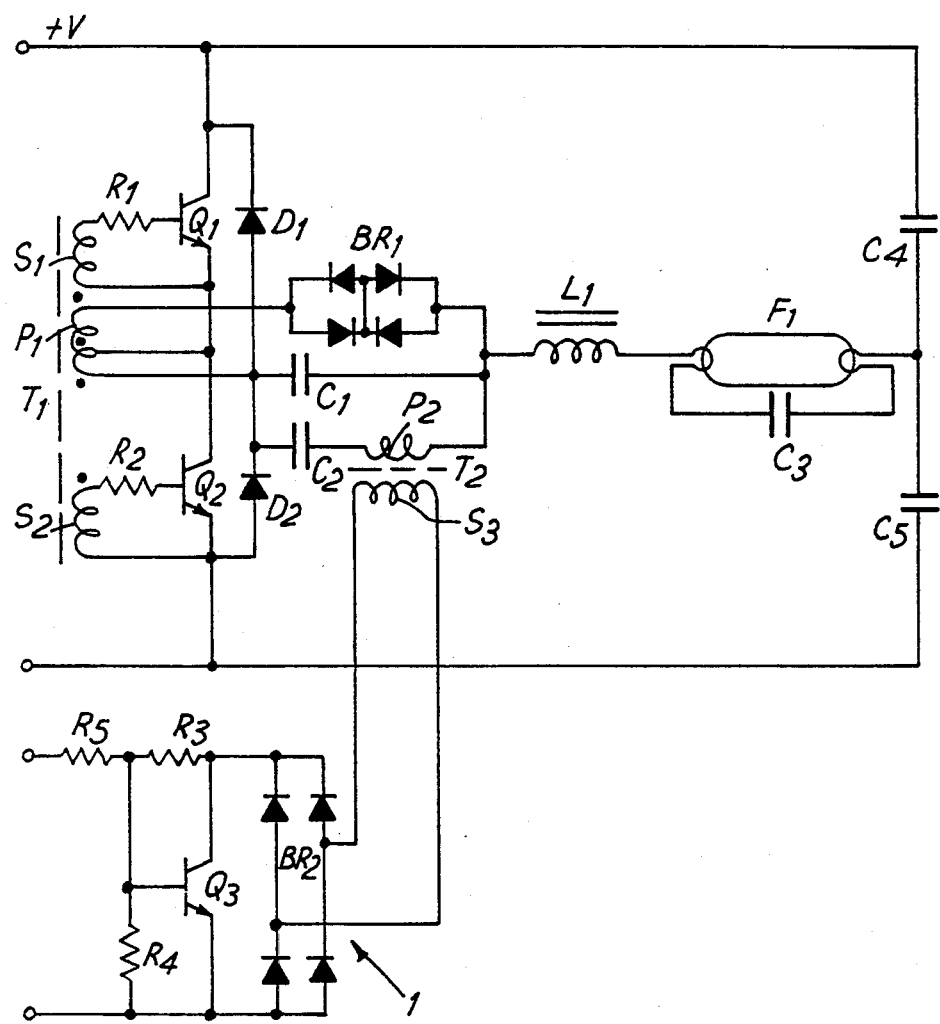

In order that the invention may be clearly understood and readily carried into effect, it will be described by way of example with reference to the accompanying drawings, of which:

FIGS. 1 to 6 show circuit paths in a self resonant inverter circuit according to the invention, used to control a gas discharge lamp, and FIG. 7 shows an inverter further including a sub-circuit to control current drawn.

Referring first to FIG. 1, this shows a gas discharge lamp $F_1$ (the load), bridged by a capacitor $C_3$, and an inductor $L_1$ is connected to the input to the cathodes of the lamp. Capacitors $C_4$ and $C_5$ are connected is series across the unidirectional current supply.

Transformer $T_1$ has a primary winding $P_1$ and two secondary windings $S_1$ and $S_2$. Each secondary winding is associated with and controls a respective switching means, for example transistors $Q_1$ and $Q_2$, connected to alternately switch the voltage applied to the circuit. In the circuit shown, the secondary windings of the transformer are connected to $Q_1$ and $Q_2$ via resistors $R_1$ and $R_2$. Each of the transistors is shunted by an associated diode ($D_1$ or $D_2$) to protect it from the inductive charge of the inductor $L_1$.

The primary $P_1$ of the transformer has a tap input with tappings arranged feeding parallel branches to inductor $L_1$, the other end of $L_1$ being connected to gas discharge lamp $F_1$. A first branch incorporates capacitive means, in this case a capacitor $C_1$. A second branch incorporates bidirectional threshold means preferably in the form of a bridge arrangement $BR_1$ having a forward voltage drop.

It is believed that the following description explains the operation of the circuit.

Figure 2:
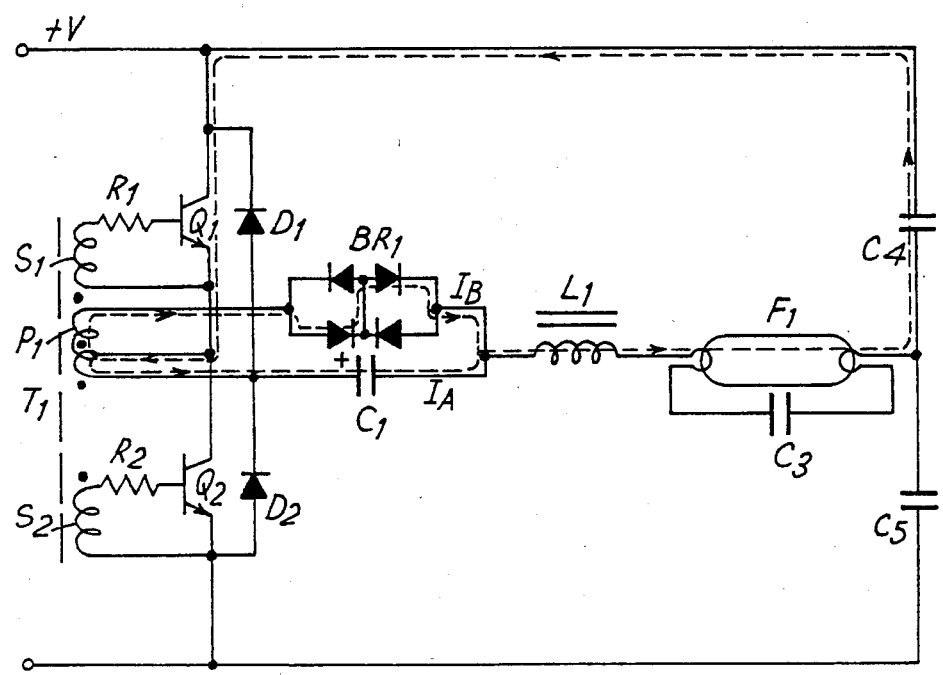

In operation, when transistor $Q_1$ is turned on, a current $I_A$ flows through it and through the primary $P_1$ of transformer $T_1$, charging $C_1$ and generating a flux in the transformer $T_1$. When the voltage on capacitor $C_1$ exceeds the forward voltage drop of the bridge rectifier, current $I_B$ (as shown in FIG. 2) flows through the bridge and generates an opposing electromagnetic force reducing the flux in the transformer. This results in $Q_1$'s drive voltage, provided by secondary winding $S_1$, falling to zero, thus initiating the turning off of $Q_1$. Current will continue to flow during a turn off delay period dependent upon the storage time of $C_1$ and the inductive charge provided by inductor $L_1$.

Figure 3:
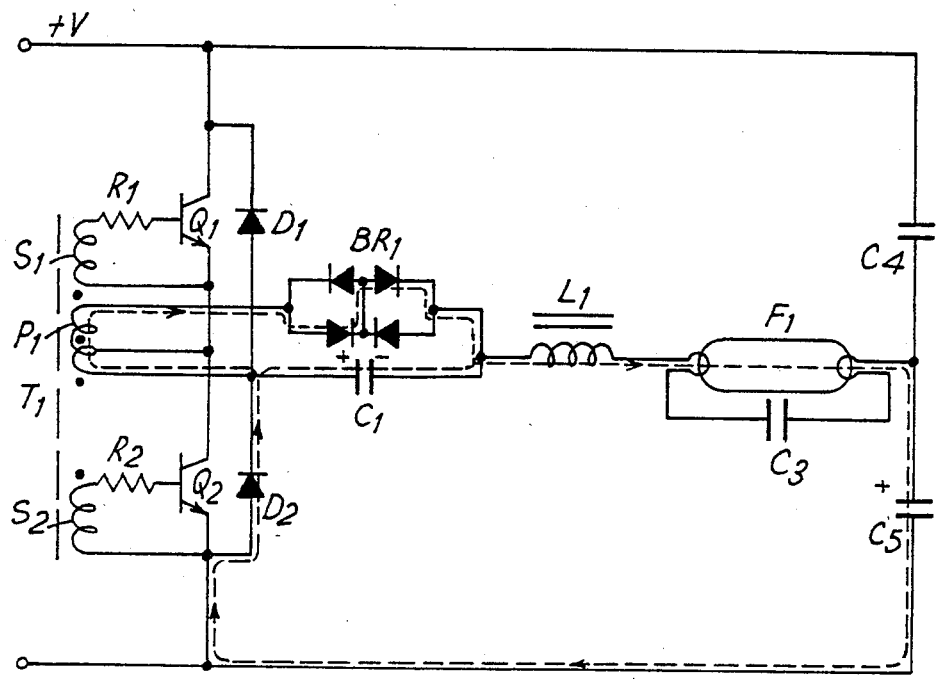

Referring to FIG. 3, when $Q_1$ is non-conductive, $D_2$ conducts the inductive charge from $L_1$. When the current flow in the primary $P_1$ ceases, the magnetic field collapses generating voltages in the secondary windings $S_1$ and $S_2$ which turn $Q_1$ harder off and $Q_2$ on.

Figure 4:
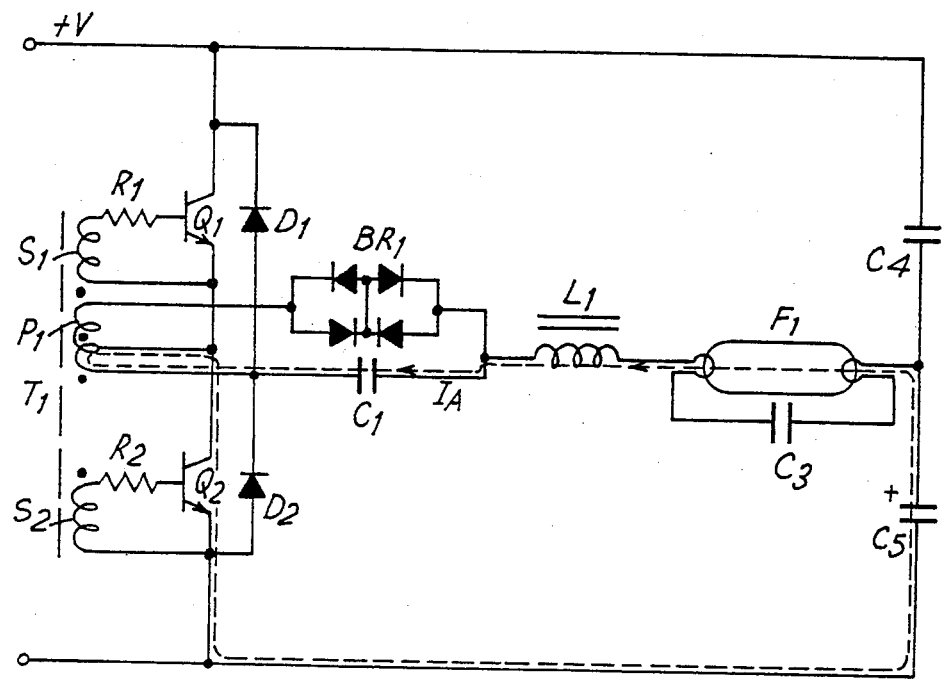

FIG. 4 shows $Q_2$ conducting current $I_A$ and $BR_1$ is no longer conducting. This is similar to the situation shown in FIG. 1 with $Q_1$ conducting. FIG. 5 shows currents $I_A$ and $I_B$ flowing through the capacitive means and bidirectionsl threshold means respectively. The total current I through the inductor $L_1$ is $I_A+I_B$. FIG. 6 shows $D_1$ conducting the inductive charge from $L_1$, the situation being similar to that shown in FIG. 3. The cycle is then repeated with transistors $Q_1$ and $Q_2$ alternately switching on and off.

The inverter's current may be varied by changing the effective capacitance of $C_1$.

Referring to FIG. 7, this shows a capacitive branch being in the form of a first capacitor $C_1$ and a second capacitor $C_2$ arranged in parallel with one another, with the $C_2$ arm incorporating a variable reactance, in this case a primary winding $P_2$ of a transformer $T_2$, for control purposes.

If the secondary winding $S_3$ of transformer $T_2$ is not loaded, then primary winding $P_2$ of $T_2$ represents a high reactance in series with capacitor $C_2$ and thus limits the current flow to $C_2$. By loading the secondary winding of $T_2$, the reactance provided by primary $P_2$ is decreased and thus by providing an adjunct control circuit 1 to control the current through the secondary winding, the reactance of the first and hence the current drawn by capacitor $C_2$ can by controlled. (The particular control circuit illustrated includes switch $Q_3$, resistors $R_3$, $R_4$ and $R_5$ and bridge $BR_2$).

Capacitor $C_2$ has preferably about ten times the capacitance of capacitor $C_1$ and thus in operation draws more current and takes a longer period to charge to the forward voltage drop of the bidirectional threshold means $BR_1$.

When the inverter is first turned on, the control circuit 1 is arranged to gradually load the secondary winding of transformer $T_2$. The current drawn by the capacitors can thus be gradually increased from a minimum level set essentially by $C_1$ to a maximum level determined by the combined capacitance of capacitors $C_1$ and $C_2$. At the minimum current level, the operating frequency is set well below the resonant frequency of inductor $L_1$ and capacitor $C_3$ associated with the lamp $F_1$. The voltage across the lamp is therefore low and cold striking of the lamp is prohibited. The minimum current drawn at the outset provides a preheat to the cathodes of the lamp. As this current is increased, the cathodes are further heated and the frequency approaches the resonant frequency so the voltage across the lamp increases and the lamp is struck. Dimming of the lamp can be achieved by operation of the control sub-circuit 1 to alter the reactance in the capacitive branch.

Variations of the circuit are possible. For example, a full bridge inverter could be used. Also alternative bidirectional conducting means having a forward voltage drop may be utilised. The capacitive branch need not have two capacitive arms and the capacitive branch could incorporate a variable resistor instead of a variable reactance, particularly where the control sub-circuit is not required.

The load may of course be other than a gas discharge lamp, and alternative switching means may be used.

I claim:

1. An inverter circuit comprising two input terminals for connecting a unidirectional current supply therebetween, two switching means connected in series across said input terminals, a transformer having two secondary windings, each of the secondary windings being arranged to control the operation of a respective said switching means, and a primary winding, the primary winding having two end connections and a tap connection, the tap connection being intermediate the end connections, said end connections being connected by parallel branches to an input of a resonant circuit adapted to receive a load, one of said branches containing bidirectional threshold means and the other of said branches containing capacitive means, an output of said resonant circuit being connected to said two input terminals via respective further capacitive means, the arrangement being such that, in use, the switching means operate essentially alternately.

2. An inverter circuit comprising two input terminals for connecting a unidirectional current supply therebetween, two switching means arranged to operate alternately, each switching means controlled by means of a respective secondary winding of a transformer, a primary winding of the transformer having separate connections to capacitive means and bidirectional threshold means, the capacitive means and bidirectional threshold means being connected as parallel branches to an input of a resonant circuit adapted to receive a load.

3. An inverter circuit according to claim 1 in which the bidirectional threshold means comprises rectifiers arranged in a bridge formation having a forward voltage drop.

4. An inverter circuit according to claim 3 in which the rectifiers are diodes.

5. An inverter circuit according to claim 1 in which the switching means are transistors each shunted by a respective unidirectional means.

6. An inverter circuit according to claim 1, the branch including the capacitive means further including a variable reactance.

7. An inverter circuit according to claim 6, the branch including the capacitive means consisting of two parallel arms, one arm comprising a first capacitor and the other of said parallel arms comprising a second capacitor and said variable reactance.

8. An inverter circuit according to claim 1, the branch including the capacitive means further including a variable resistor.

9. An inverter circuit according to claim 6 further including a sub-circuit to regulate the reactance.

10. An inverter circuit according to claim 6, in which the variable reactance is provided by the primary winding of a further transformer.

11. An inverter circuit according to claim 9 in which the sub-circuit controls the current through a secondary winding of said further transformer and hence controls the reactance of the first.

* * * * *